US007074059B2

(12) United States Patent
Valcher et al.

(10) Patent No.: US 7,074,059 B2
(45) Date of Patent: Jul. 11, 2006

(54) FRAUD PROTECTION FOR SMART CARD CONNECTOR

(75) Inventors: Fabrice Valcher, Dole (FR); Olivier Masson, Dole (FR); Patrick Daubigney, Authume (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/219,614

(22) Filed: Sep. 2, 2005

(65) Prior Publication Data

US 2006/0073736 A1 Apr. 6, 2006

(30) Foreign Application Priority Data

Sep. 7, 2004 (FR) .................................. 04 51974

(51) Int. Cl.
*H01R 13/658* (2006.01)

(52) U.S. Cl. ......................... 439/95; 439/108; 439/607

(58) Field of Classification Search .................. 439/95, 439/92, 108, 607, 152, 329, 630, 631
See application file for complete search history.

(56) References Cited

U.S. PATENT DOCUMENTS 5,775,949 A 7/1998 Bricaud et al.
6,247,967 B1 * 6/2001 Wu et al. .................. 439/607
6,447,338 B1 9/2002 Bricaud et al.
6,786,748 B1 * 9/2004 Masson et al. ............. 439/188
6,899,565 B1 * 5/2005 Kodera et al. .............. 439/607
6,939,148 B1 * 9/2005 Yu .............................. 439/92
2003/0022537 A1 * 1/2003 Bricaud et al. ............. 439/152
2005/0124222 A1 * 6/2005 Fan ............................ 439/630
2005/0215084 A1 * 9/2005 Ho et al. ....................... 439/64
2005/0219832 A1 * 10/2005 Pawlenko et al. .......... 361/818
2006/0040558 A1 * 2/2006 Ho ............................. 439/607

* cited by examiner

*Primary Examiner*—Alexander Gilman
(74) *Attorney, Agent, or Firm*—Peter Van Winkle

(57) ABSTRACT

A smart card connector with a signal blade contact (22*a*, FIG. 5) and a ground blade contact (22*b*), wherein the signal blade contact has a signal tail (34*a*) at the rear end of the connector frame, and wherein the connector is provided with a shield structure (110) that prevents a person from fraudulently contacting the signal tail during use of the connector. The shield structure includes an insulative barrier (60) with a hole (76) through which the signal tail extends, and also includes a sheet metal shield (40) with a rear portion that extends largely around the signal tail to ground any conductor that is fraudulently inserted against the signal tail. The sheet metal shield has a transverse tongue (54) that extends to and engages the ground blade contact. The insulative barrier has a slot that extends largely around the signal tail, and the sheet metal rear shield portion lies in the slot.

7 Claims, 8 Drawing Sheets

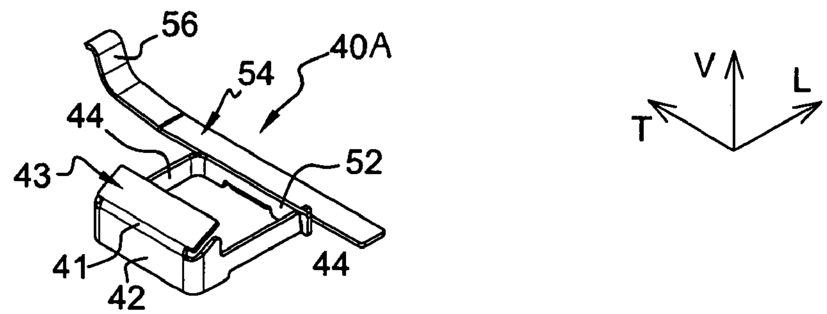
Fig. 8
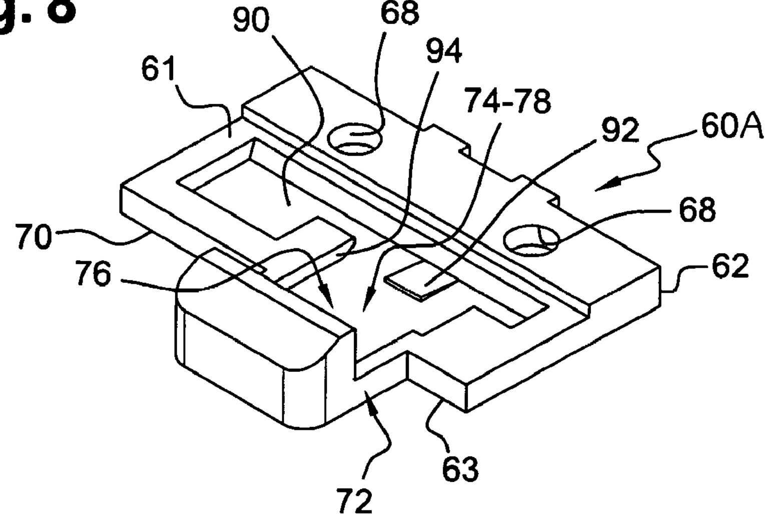
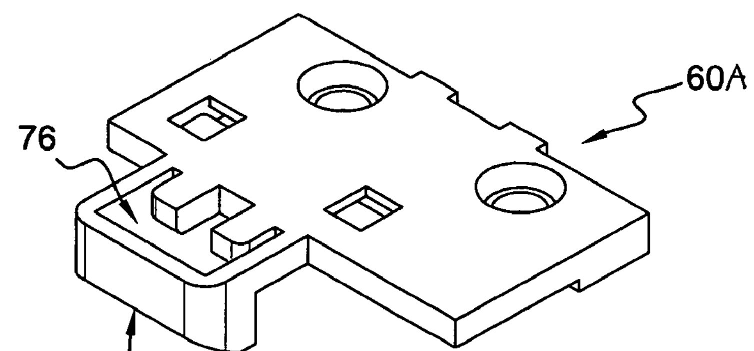
Fig. 9
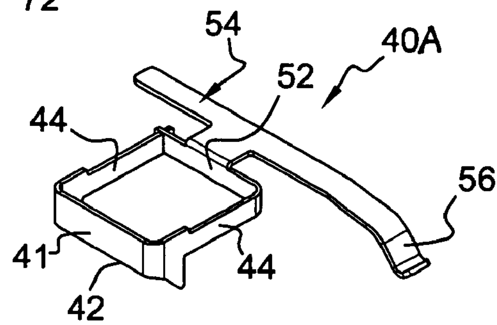

FRAUD PROTECTION FOR SMART CARD CONNECTOR

CROSS-REFERENCE

Applicant claims priority from French application 0451974 filed Sep. 07, 2004

BACKGROUND OF THE INVENTION

Smart cards, which are about the size of a credit card or smaller and that have contact pads on their lower surfaces, contain memory chips that are read out or written into by smart card connectors. A common type of smart card connector has a card-receiving slot at its rear end, into which a card can be forwardly inserted, until the card is fully inserted and blade contacts engage the card pads. The connector is mounted on a circuit board, with the contacts having tails soldered to traces on the board. Most contacts carry signals, and usually one contact is a ground contact. At least one of the signal contacts is an I/O (input/output) contact that may carry signals to read circuitry that authorizes a transaction, and protection of that signal contact is especially important.

The blade contacts are usually arranged in two rows, including forward and rearward rows. The blade contacts of the rear row extend to the rear of the connector where their tails are soldered to circuit board traces. The rear blade contacts and rear traces are the closest to the card user. Smart card connectors that are used in public places, and especially when unattended, are subject to fraudulent attempts, such as to authorize a transaction. One type of fraud attempt involves inserting a conductor from a position at the rear of the card connector slot while a card lies in the slot (the connector will not operate unless it senses a fully inserted slot). This may involve fraudulently drilling a hole into the rear of the connector or of the circuit board to insert the conductor against the tail or circuit board trace of the I/O contact. It would be useful if a region about a signal tail and corresponding circuit board trace were protected from engagement with a conductor inserted by an unauthorized person, and especially from a voltage (above or below ground potential) that such conductor carried.

SUMMARY OF THE INVENTION

In accordance with one embodiment of the invention, a smart card connector is provided of the type that has at least one signal blade contact and a ground blade contact, each contact having a tail that is soldered to a corresponding trace on the circuit board. The invention provides a shield structure that shields the signal tail against engagement with a fraudulently inserted conductor, and that grounds any such conductor. The shield structure includes a sheet metal shield with a rearward portion that largely surrounds the tail of the signal contact. The sheet metal shield has a tongue that directly engages the grounded blade contact. This avoids the need to connect the sheet metal shield directly to a ground trace on the circuit board.

The shield structure also includes an insulative barrier with a hole though which the signal tail extends down to the circuit board trace. The insulative barrier has a slot that extends more than 180° around the hole, and the sheet metal shield rear portion lies in the slot and extends more than 180° about the hole.

Other characteristics and advantages of the invention will become apparent on reading the derailed description which follows for the understanding of which reference may be made to the appended drawings.

BRIEF DESCRIPTION OF THE DRAWINGS

FIGS. 8 though 10 are views similar to those of FIGS. 3 though 5, which show another embodiment of the sheet metal shield and insulative barrier of the shield structure.

DESCRIPTION OF THE PREFERRED EMBODIMENT

Limited Description of the Invention

Figure 1:
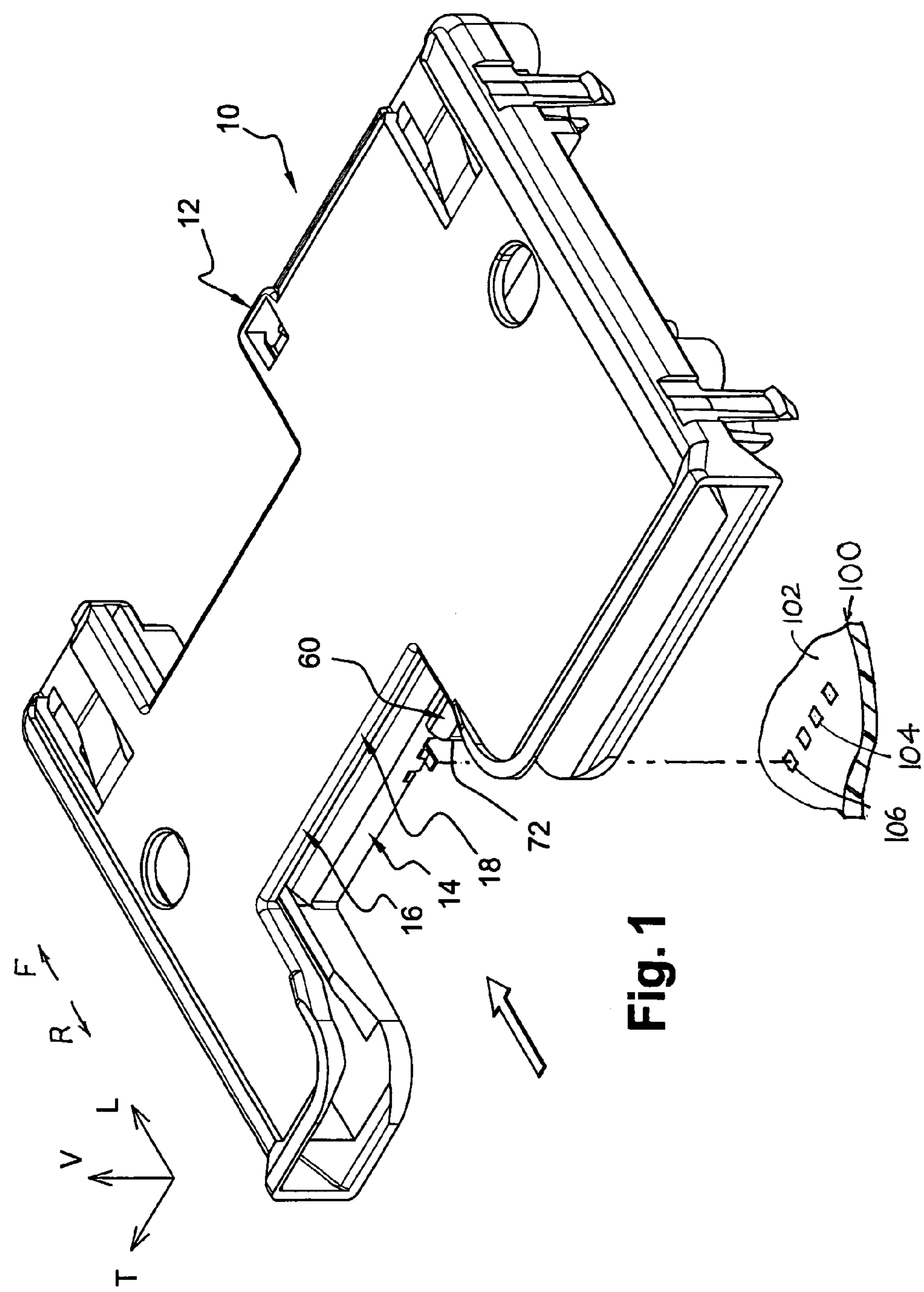
FIG. 1 is an exploded top and rear isometric view of a smart card connector of the invention, and of a portion of a circuit board on which the connector is designed to be mounted.
Figure 6:
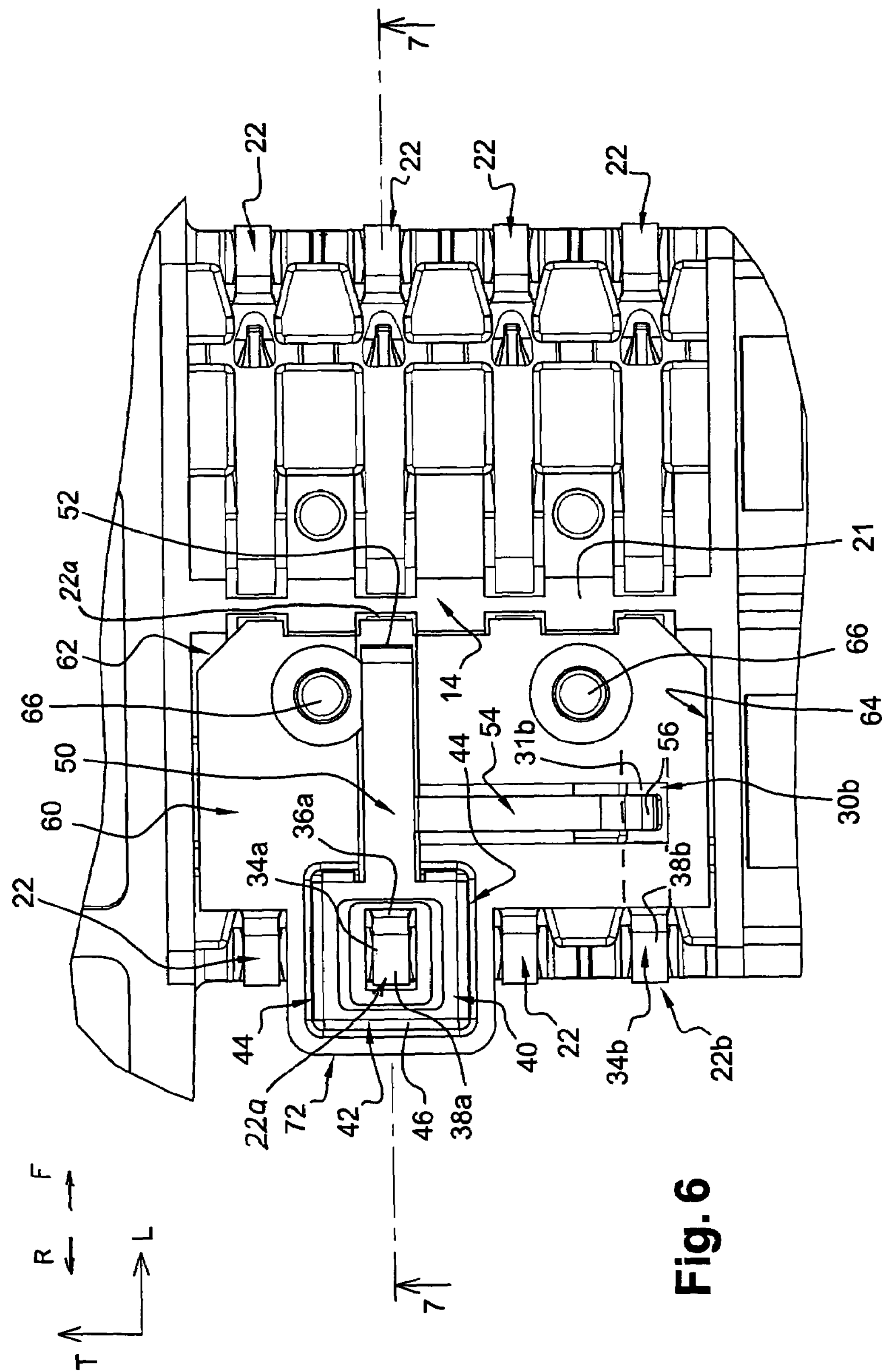
FIG. 6 is an enlarged bottom view of the portion of the connector shown in FIG. 5.

FIG. 1 illustrates a smart card connector 10 which includes a molded frame or body 12 of insulative material such as plastic, and which is designed to be mounted on a circuit board 100. The circuit board has an upper face 102 with conductive traces thereon including a signal trace 104 for connection to an I/O (readin and readout) signal tail of a contact and a ground trace 106 for connection to the tail of a grounded contact. The frame 12 includes lower and upper plates 14, 16 that form a slot 18 between them. The slot is designed to receive a memory card, often referred to as a smart card, by the card being inserted in a forward direction F into the slot. Such card has contact pads on its lower surface, which are engaged by eight contact blades, or blade contacts 22 (FIG. 6).

Most of the blade contacts 22 are signal contacts, and one of them **22*a* is an I/O signal contact which delivers signals to a circuit connected to the connector, that can authorize a transaction. Another blade contact 22*b* is a grounded contact that is connected to the ground trace on the circuit board. When applicant is referring specifically to blade contact 22*a* or blade contact 22*b*** and its parts, applicant sometimes uses the designation “a” or “b” after the number. Corresponding parts of the other contacts have the same number but do not have a letter “a” or “b” after the number. The connector includes eight identical blade contacts, arranged in two sets, the rear set having its tails at the rear end of the connector in a frame cutout thereat, and the front set having its tails at the front end of the connector in a frame cutout therein. The tails at the rear end of the connector are the most vulnerable ones to attempted fraud, and are the tails discussed in the following description.

Figure 7:
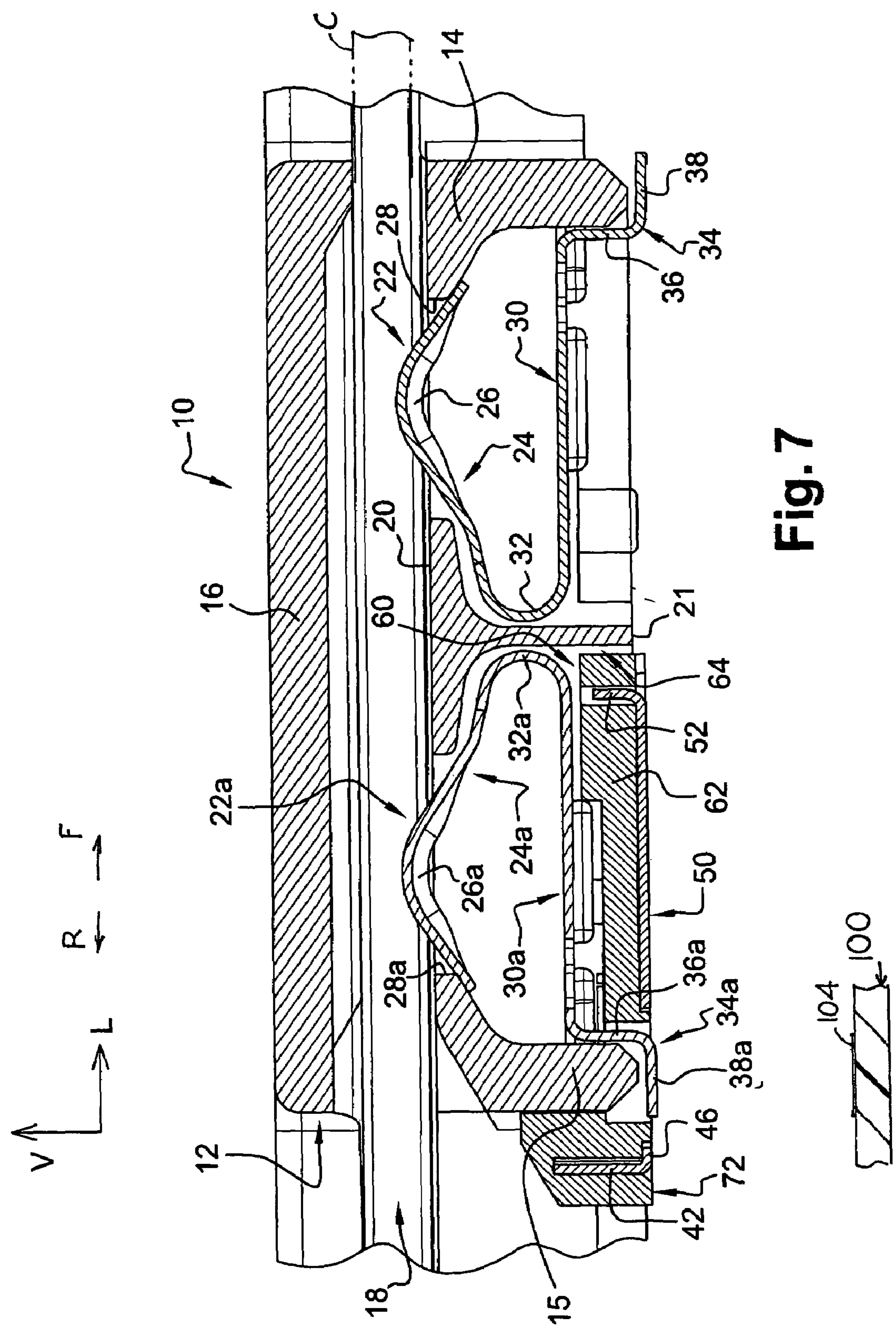
FIG. 7 is an enlarged view taken on line 7—7 of FIG. 6, and showing a portion of a circuit board on which the connector is mounted.

As shown in FIG. 7, each rear contact such as **22*a* has a card-engaging end 26*a* that projects vertically beyond the face 20 of the lower plate. The card C has a lower face that lies facewise adjacent to the frame face 20, so the card-engaging end 26a engages a contact pad of a fully inserted card. The contact has about a 180° loop 32a leading to a horizontal main branch 30a whose rear end merges with the tail 34a. The tail has a vertical branch 36a that extends down to a right angle bend that leads to a horizontal tail branch 38a. The horizontal tail branch is designed to be soldered to a trace 104** on the circuit board.

In accordance with the present invention, applicant provides a shield structure 110 (FIG. 5) that extends largely around the blade contact tail 34a to protect it, and which includes a rear part 116 that lies rearward of the signal tail 34a. The shield structure includes an insulative, or dielectric, barrier 60 and an electrically conductive sheet metal shield 40. The insulative barrier 60 forms a vertical passage or hole 76 and the signal tail 34a passes vertically though the hole, with its horizontal branch 38a that is to be soldered, lying at the bottom of the hole.

The sheet metal shield 40 includes a rear portion 112 that includes a rear protection plate 42 and side plates 44 that lie around the hole 76. The sheet metal shield is provided so that if someone attempts to insert a conductor against the signal tail 34a, the sheet metal shield will ground that conductor and therefore will ground the signal tail. A fraudulent person may, for example drill a hole though the insulative barrier 60 and insert a conductor through the drilled hole to try to contact the signal tail 34a. Such inserted conductor is very likely to contact the sheet metal shield. The read/write circuitry connected to the signal trace 104 will detect such grounding of signal tail 34a and deny authorization for a transaction.

The rear portion of the sheet metal shield lies in a slot 114 in the insulative barrier. The slot and the sheet metal rear portion each extend more than 180° (including small gaps in the shield) around the axis 120 of the hole 76. This provides sheet metal shield protection at the rear and sides of the hole 76.

Figure 3:
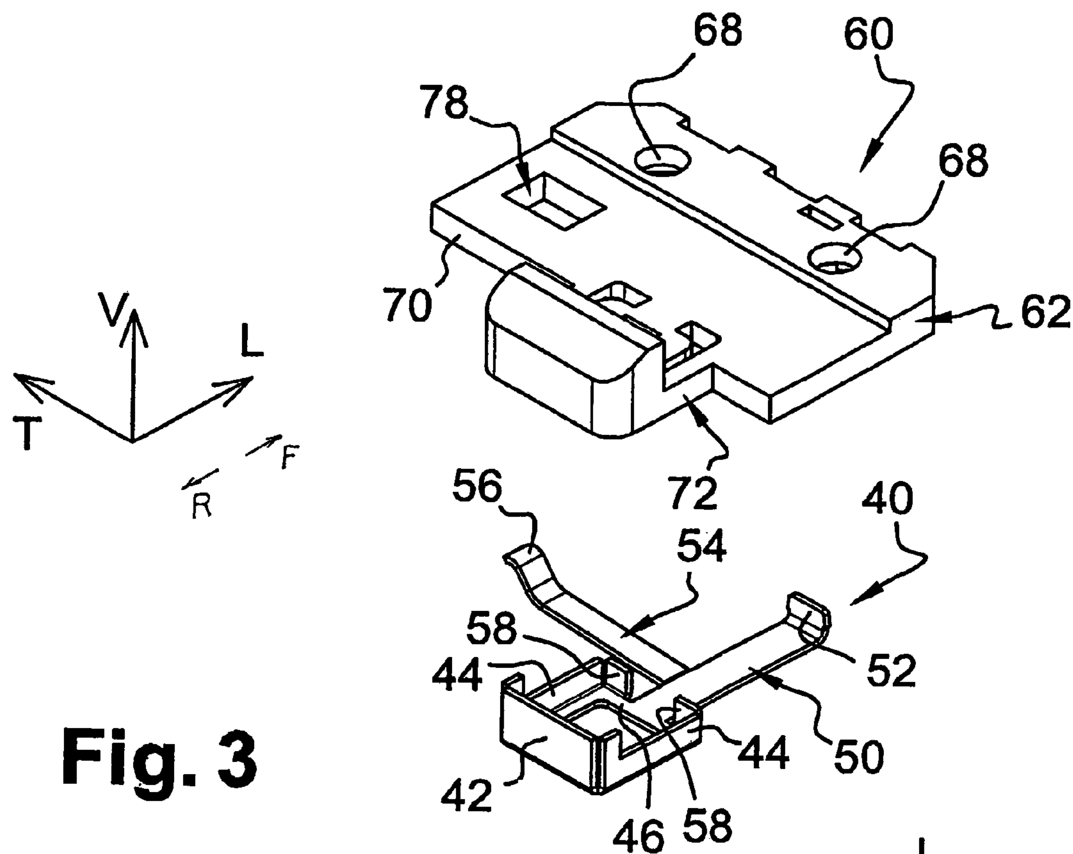
FIG. 3 is an exploded top isometric view of the sheet metal shield and insulative barrier of FIG. 1, taken from the same angle as in FIG. 1.
Figure 4:
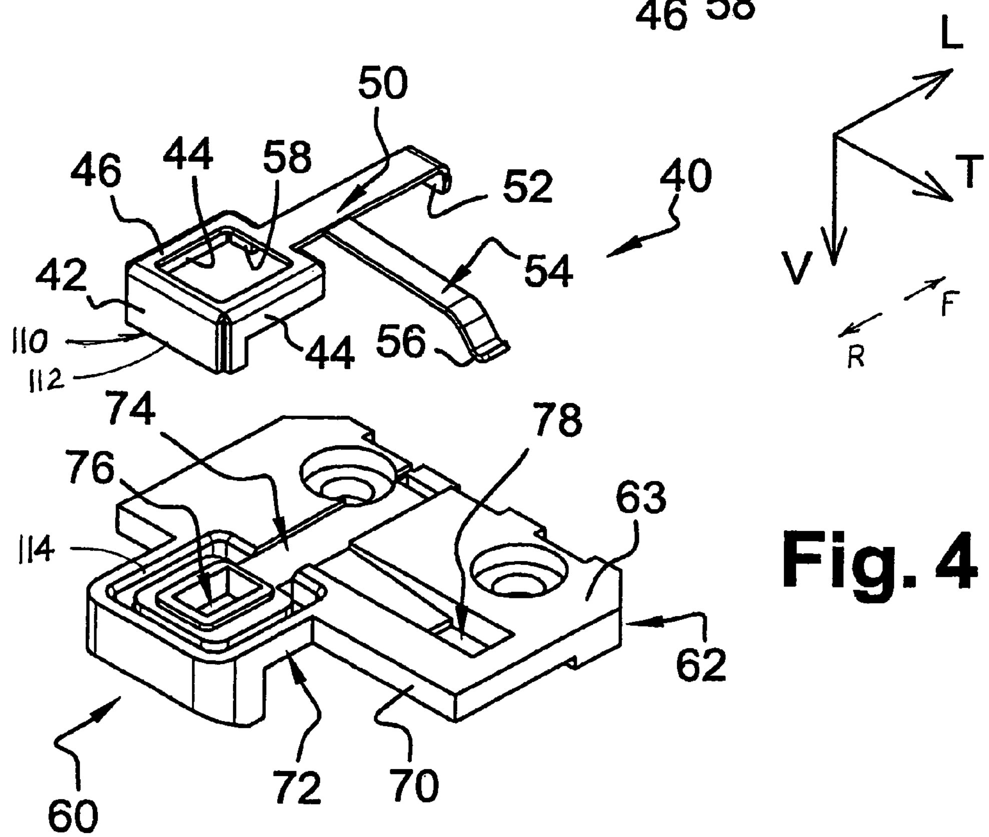
FIG. 4 is an exploded bottom isometric view of the shield and barrier of FIG. 3, taken from the same angle as in FIG. 2.
Figure 5:
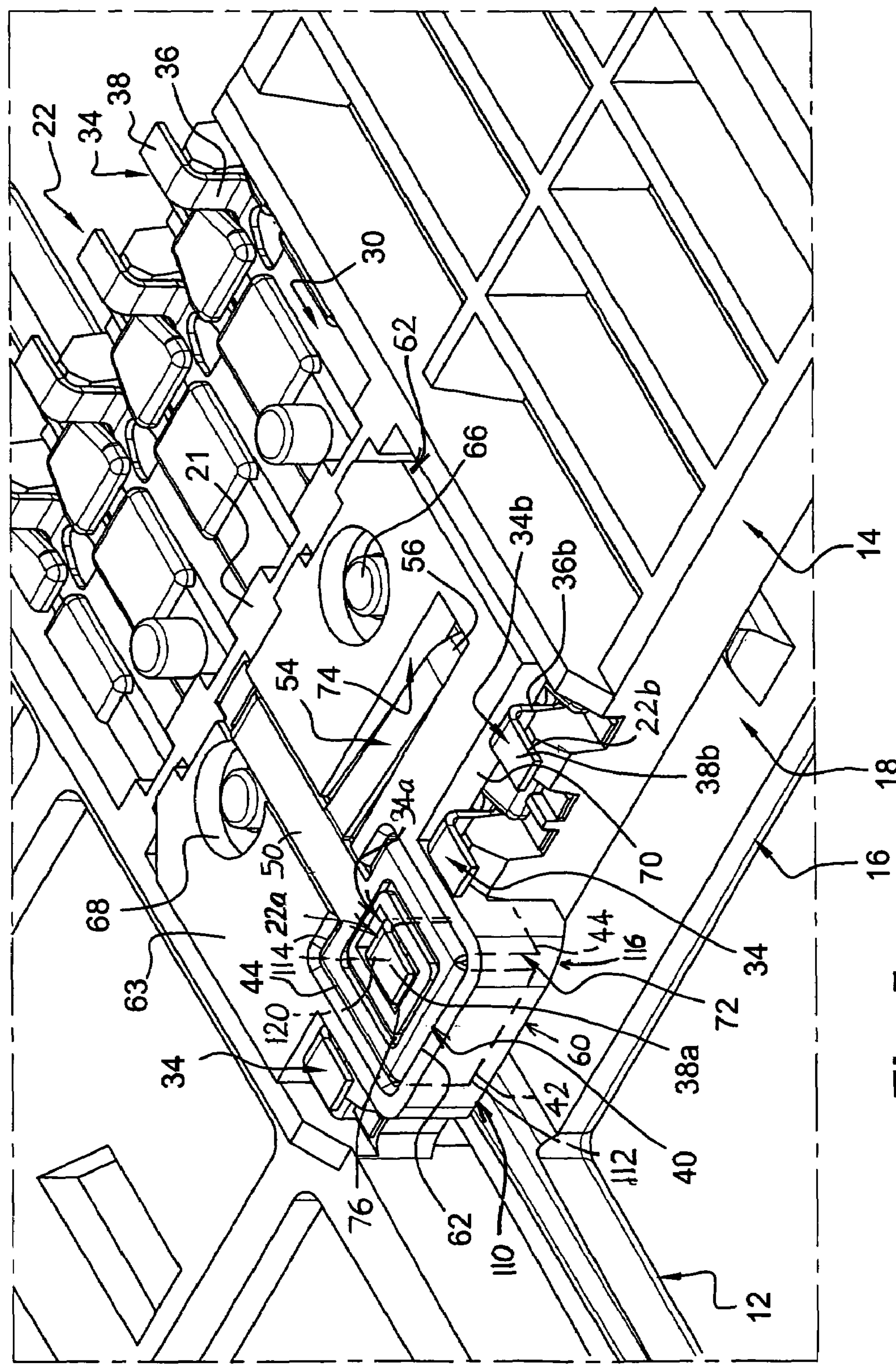
FIG. 5 is an enlarged isometric rear and bottom view of a portion of the connector of FIG. 2.

FIGS. 3 and 4 show details of the sheet metal shield 40 and of the insulative barrier 60. The insulative barrier includes a support plate 62 with a pair of mounting hole 68, and a rearward extension 72. The rearward extension forms the tail-receiving hole 76 (FIG. 4) and forms the slot 114 that receives the sheet metal rear portion 112. The sheet metal shield includes a forwardly-extending protective tongue 50 and a transversely extending tongue 54 that extends from the forwardly-extending tongue. FIG. 5 shows that the forwardly-extending tongue 50 of the grounded sheet metal shield, extends directly forward to lie under the I/O signal blade contact. FIG. 7 shows that the tongue 50 lies under the portion of the blade that extends forward of the tail 34a. If a person should drill a hole upward though the circuit board and insert a conductor through the drilled hole to contact the signal blade, such conductor would very likely also touch the grounded tongue 50 and cause the read/write circuitry to deny authorization for a transaction.

The transverse tongue 54 shown in FIG. 5 extends transversely, and it directly contacts the main horizontal branch 30b (FIG. 6) of the grounded contact. This avoids the need for the sheet metal shield to engage a ground trace on the circuit board. The bottom wall 46 (FIG. 7) of the sheet metal shield rear portion and the bottom of the insulative barrier extension 72 can be positioned to lie against the circuit board because no part of the sheet metal shield has to press down against a ground trace on the circuit board. This prevents a thin conductor from being slid under the shield structure rear end.

The connector frame 12 has a cavity 64 (FIG. 6) in its bottom that receives the plate 62 of the insulative barrier, with the rearward extension 72 of the barrier extending rearward of the middle connector frame portion and into the rear cutout of the frame. Posts 66 of the connector frame project down into the plate holes and are deformed to enlarge them to hold the insulative barrier on the frame. FIG. 4 shows that the plate has two recesses 74 and 78. The horizontal rearwardly-extending recess 74 holds the rearwardly-extending protective tongue 50. The transversely-extending tongue that lies in recess 78 is inclined upward and projects through a hole at the end of recess 78 so the transverse tongue 54 can directly engage the ground blade contact.

Although terms such as "horizontal" and "downward" have been used to describe the invention as it is illustrated, it should be understood that the smart card connector can be used in any orientation.

Thus, the invention provides a smart card connector having at least one signal blade contact, particularly an I/O blade contact that is vulnerable to fraudulent engagement with a conductor, with a shield structure that resists such fraud. The shield structure includes a sheet metal shield and an insulative barrier. The sheet metal shield is grounded and extends largely around the tail of the signal blade contact. The insulative barrier largely surrounds the sheet metal shield. The insulative barrier has a vertical hole though which the signal tail extends, and the insulative barrier has a slot that extends largely (at least 180°) about the hole axis with the shield rear portion lying in the slot. The sheet metal shield is electrically grounded, by providing it with a transverse tongue that directly engages a grounded blade contact. The sheet metal shield also has a protective tongue that lies directly under the main horizontal branch of the signal contact.

DETAILED DESCRIPTION OF THE INVENTION

In the description that follows, identical, similar or analogous components will be denoted by the same reference numerals.

Without implying any limitation, to make it easier to understand the description and the drawings the terms "vertical", "horizontal", "lower", "upper", "top", "bottom", "transverse", "longitudinal", etc. will be adopted with reference to the reference frame L, V, T indicated in the figures.

Figure 2:
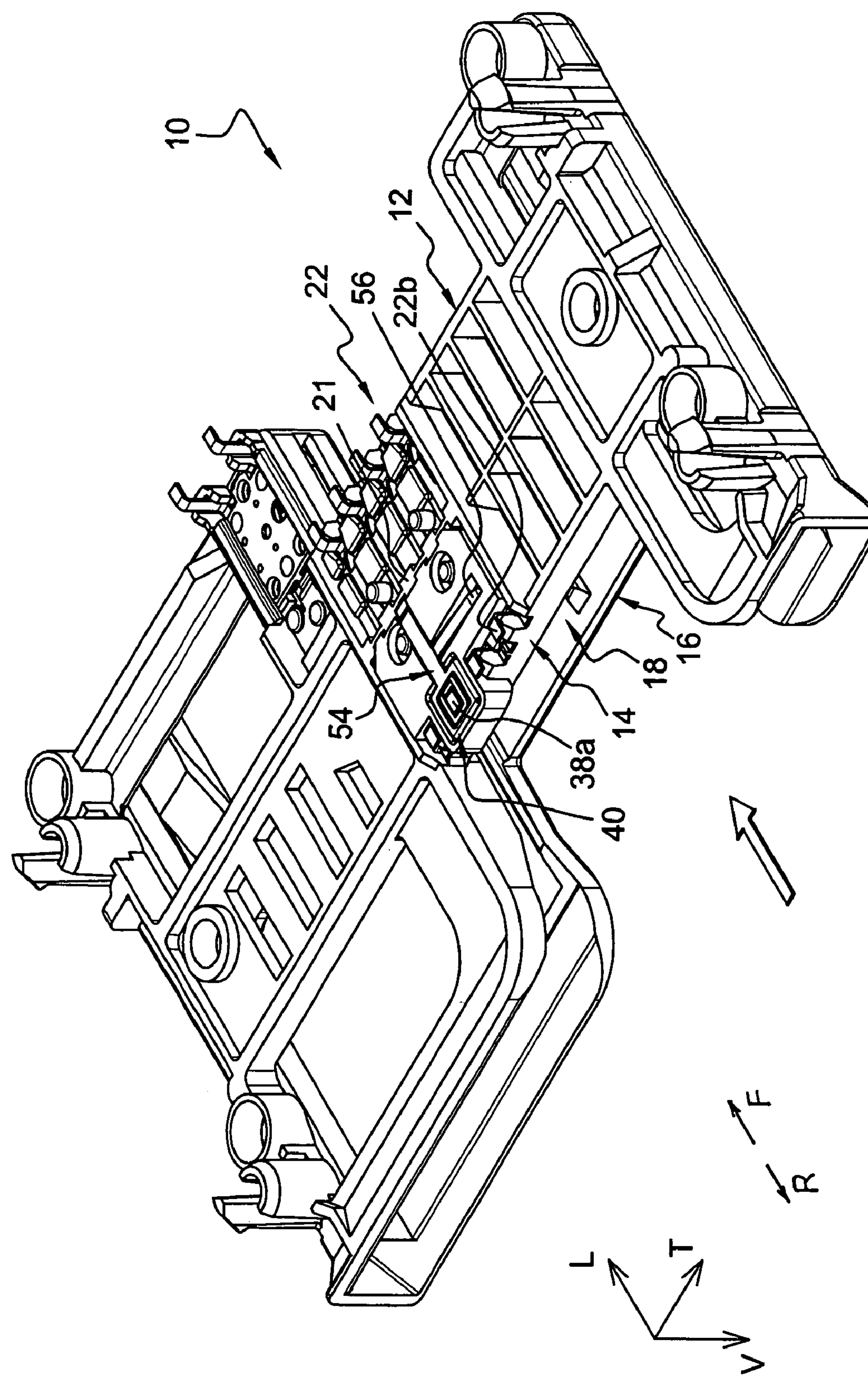
FIG. 2 is a an isometric bottom view of the connector of FIG. 1.

FIGS. 1 and 2 show a connector 10 consisting essentially of an insulating plastic body or case produced by molding.

The general design of the connector 10 with its insulating body or frame 12 being of the type described and shown in the document U.S. Pat. No. 5,775,949.

The frame 12 essentially consists of a lower horizontal plate 14 and an upper horizontal plate 16 which between them define a longitudinal slot 18 for the forward insertion, from the rear, along the direction indicated by the arrow "L" in FIGS. 1 and 2, of a memory card that includes, on its lower face, conducting pads placed in a standardized fashion.

In its central part, along the transverse direction "T", the lower plate 14 constitutes the contact-bearing insulating block of the connector which bears, in a known fashion, two groups, each of four electrical contact blades 22.

The general design of the contact-bearing block with its blades is for example described and shown in detail in the document U.S. Pat. No. 6,447,338. All the contact blades here are identical.

Each contact blade 22 (FIG. 7) generally lies in a longitudinal vertical plane and includes a largely horizontal upper branch 24 that has a convex curved first end 26 called the "contact" end that contacts a corresponding pad on the card. The free contact end 26 projects, vertically upwards through a hole 28, from the horizontal plane of the upper plane face 20 of the insulating block 14.

The blade 22 has a lower horizontal branch 30 that is connected to the upper contact branch 24 via a loop 32 of about 180° so that the blade 22 has here the form of a hairpin.

The horizontal branch 30 constitutes the longitudinal central connection portion, or mounted portion of the contact blade 22, which connection portion ensures that the blade 22 is positioned and fastened in the insulating block 14.

The connecting lower branch 30 is extended by and terminates in a second end of the contact blade 22, called the connection end, which is in the form of a right-angled connection tab 34 or tail which allows the blade 22 to be electrically connected to a processing circuit (not shown) of a read/write device (not shown).

The connection tab 34 includes here a vertical branch 36 that extends, from the end of the connecting branch 30, downwards, so as to be approximately level with the lower horizontal face 21 of the insulating block 14.

The connection tab 34 also includes a horizontal branch 38 that extends the vertical branch horizontally and which lies slightly below the plane of the lower face 21.

The connection tabs or tails 34, each with a horizontal branch 38, are in this case of the type to be soldered, for example reflow-soldered, to corresponding conducting tracks on the upper face of a printed circuit board (PCB).

As may be seen for example in the right-hand part of FIGS. 6 and 7, it is possible, in the design of the prior art of a blade not protected against break-ins, to access this contact blade, for example vertically upwards and/or longitudinally from the right to the left when considering the right-hand contact blade 22 of FIG. 7.

The invention aims to preferentially protect one of the contact blades 22, which in this case is the blade 22*a* called the I/O blade, the design of which is in every point analogous to that of the seven other blades of the connector, and therefore analogous to that which has just been described in detail.

In the figures and the rest of the description, the contact blade protected according to the teachings of the invention, and all its parts, will be denoted by the same reference numerals as the other blades, but with the letter "a" as suffix.

Among the group of eight blades of the connector may also be distinguished the blade 22*b* (FIG. 6), called the "earth" or ground blade, denoted, together with all its parts, by the same reference numerals but with the letter "b" as suffix.

In the embodiment illustrated in the figures, and according to the standardization in force, the earth contact blade 22*b* is a blade that belongs to the same group of four blades as the contact blade 22*a* and is placed parallel to the latter, with another contact blade 22 interposed between the blades 22*a* and the blades 22*b*.

If it is desired to protect the contact blade 22*a* (FIG. 7) against any attempt at break-in, it is desirable to protect, on the one hand, its lower branch 30*a* and, on the other hand, its connection tab or tail 34*a* with its two branches 36*a* and 38*a*.

According to the teachings of the invention, this protection is achieved by means of a shield or protective metal cage 40, which is illustrated in particular in perspective in FIGS. 3 and 4.

The protective metal cage 40 is made of a conductive metal sheet, cut and folded.

It consists mainly of a first, vertical rear transverse, protective plate 42 and two opposed lateral vertical longitudinal plates 44 that are joined together by a horizontal lower frame 46 of square outline.

In the mounted position of the protective cage 40 in the insulating block 14 of the connector 10, and as may be seen in particular in FIG. 7, the transverse first protective plate 42 extends vertically upwards from the plane of the lower face 21 of the insulating block, or lower plate 14 over a height greater than that of the connection tab 34*a*, and especially over a height greater than that of the transverse vertical branch 36*a* of the connection tab 34*a*. As may be seen in FIG. 3, the longitudinally oriented lateral vertical plates 44 extend over a smaller height, vertically upwards, than that of the rear plate 42 and they have the function of laterally protecting the horizontal branch 38*a*, along its two opposed sides.

It will thus be understood that any attempt at gaining access to the connection tab either in a horizontal, longitudinal direction from the rear, by transpiercing the plate 42, or in horizontal, transverse direction from one side or the other, by transpiercing one of the lateral plates 44, results in the protective cage 40 being brought into electrical contact with the contact blade 22*a*, that is to say especially with its connection tab or tail 34*a*.

In so far as—in accordance with the teachings of the invention and as will be described further on—the protective cage 40 is itself electrically connected to the earth contact blade 22*b*, the break-in attempt results in the earth short-circuiting of the contact blade 22*a*.

As may be seen in FIGS. 3 and 4, in the plane of the horizontal frame 46, the protective cage 40 is extended longitudinally towards the center of the insulating block 14 by a lower horizontal protective plate 50 of longitudinal orientation which, in the mounted position of the protective cage, and as may be seen in FIGS. 6 and 7, extends longitudinally opposite the lower horizontal connection branch 30*a* of the contact blade 22*a*.

As may be seen in FIGS. 3, 4 and 7, the free end of the horizontal protective plate 50 has an upwardly curved vertical strand 52.

Any attempt at reaching the blade 22*a* in line with its lower horizontal branch 30*b*, by passing through the lower horizontal protective plate 50, again results in a short circuit being established between the blade 22*a* and earth.

As may be seen in FIGS. 3, 4 and 6, the protective cage 40 includes a lateral tongue 54 that extends transversely from a longitudinal edge of the horizontal contact plate 50.

This earth contact tongue 54 has a convex curved free end section or tail 56, the convexity of which is oriented upwards, which free end section, in the mounted position of the protective cage 40, is in electrical contact with a facing portion of the lower face 31*b* of the horizontal connection branch 30*b* of the earth contact blade 22*b*.

The shape of the connection tongue 54 with its curved end 56 and the attachment of the protective cage 40 are such that the end 56 is in bearing elastic contact with the lower face 31*b*.

The protective cage 40 thus makes it possible to protect most of the sensitive regions of the contact blade 22*a* that are accessible.

It will be noted that the upwardly curved strand 52 (FIG. 3), in co-operation with two small vertical transverse protective plates 58, which are parallel to the rear transverse protective plate 42, which extend laterally on either side of the horizontal plate 50 and which are connected to the frame 46, also provides protection against any attempt aimed at piercing longitudinally and horizontally, from the right to the left when considering FIG. 7, in order to reach, for example, the vertical transverse branch 36*a*.

According to another feature of the invention, an insulating barrier, or support 60 (FIG. 4) consisting of a molded component made of insulating plastic is provided in order to insulate and mount the protective cage 40.

Overall, the support 60 is in the form of a horizontal plate 62 of substantially rectangular shape, which is housed in a pre-existing complementary cavity 64 (FIGS. 6 & 7) formed in the lower face 21 of the insulating block 14 and which is open vertically downwards.

As may be seen especially in FIG. 6, the cage-surrounding insulating support 60 extends transversely opposite the four blades of the group to which the blades 22*a* and 22*b* belong and substantially longitudinally over the greater part of the length of these blades.

The insulating support 60 in the housing 64 is for example attached by means of plastic studs 66 (FIG. 6) of the insulating block 14, which studs pass through corresponding holes 68 in the plate 62, the lower free ends of which studs are hot-crimped.

The plate 60 may also be attached by any other means, for example by adhesive bonding.

The plate 60 may also be held in place in the housing 64, sandwiched between the insulating body and the upper face of the printed circuit board PCB on which the connector 10 is mounted.

Near its rear transverse edge 70 (FIG. 5), the plate 62 of the insulating support 60 has a rearward longitudinal extension 72.

Formed in the lower face 63 of the plate 22, and of its extension 72, is a cavity 74 that is complementary to the shapes and dimensions of the protective cage 50 so that the latter can be inserted into the cavity 74 and attached therein.

The protective cage 40 and the insulating support 60 may be produced in the form of independent components that are assembled subsequently.

According to an alternative embodiment, the insulating support 60 may be produced by overmolding around the protective metal cage 40.

The extension 72 has, at its center, a rectangular parallelepipedal hole 76 opening vertically at its two ends and intended to house, as may be seen in FIGS. 6 and 7, the connection tab or tail 34*a* and a vertical partition portion 15 of the corresponding part of the insulating block 14.

The design of the plate 62 with its extension 72 and of the cavity 74, in association with the design of the protective cage 40, are such that, in the mounted and assembled position of the protective cage 40 with its insulating support 60, there is always a partition of insulating plastic between a protective plate belonging to the protective cage 40 and a facing portion of the contact blade 22*a*, especially a facing portion of its connection tab 34*a* or of its horizontal connection branch 30*a*.

Of course, the support plate 62 also includes another vertical opening hole 78 for the passage of the convex curved end 56 of the lateral earth connection tongue.

The invention is not limited to the embodiment that has just been described.

As alternative embodiments (not shown), the invention can be applied to all types of connector having a contact-carrying insulating block independently of the design of the means for guiding the card, it being possible for the latter to be put into place in any orientation relative to the contact-bearing insulating block 14.

In the embodiment illustrated in FIGS. 8 to 10, it may firstly be seen that the protective metal cage 40A is modified as follows.

Firstly, the first transverse plate 42, which extends transversely and vertically upwards, is extended, from its upper transverse edge 41, by a complementary inclined transverse plate 43 so as to even better protect against any attempt to access the connection tab or tail 34*a* in longitudinal (from the left to the right) inclined direction through the card insertion slot.

Moreover, the upwardly curved strand 52 and the two small vertical transverse protective plates 58 are here replaced by a front vertical transverse plate 52, which is parallel to the first tab 42 and extends over the entire transverse width of the metal cage 40A in order to connect the ends of the lateral vertical plates 44.

Thus, the frame 46 (illustrated previously) is omitted and the four vertical plates 42, 44 and 52 constitute a loop of square outline constituting a protective cage around the connection tab 34*a*.

The earth contact tongue 54 is connected to the upper transverse edge of the plate 52.

In this alternative embodiment, the protective cage 40A does not include a horizontal longitudinal protective plate such as the plate 50 (illustrated previously).

The insulating support 60A is also modified and adapted to the modified design of the protective cage 40A.

Figure 10:
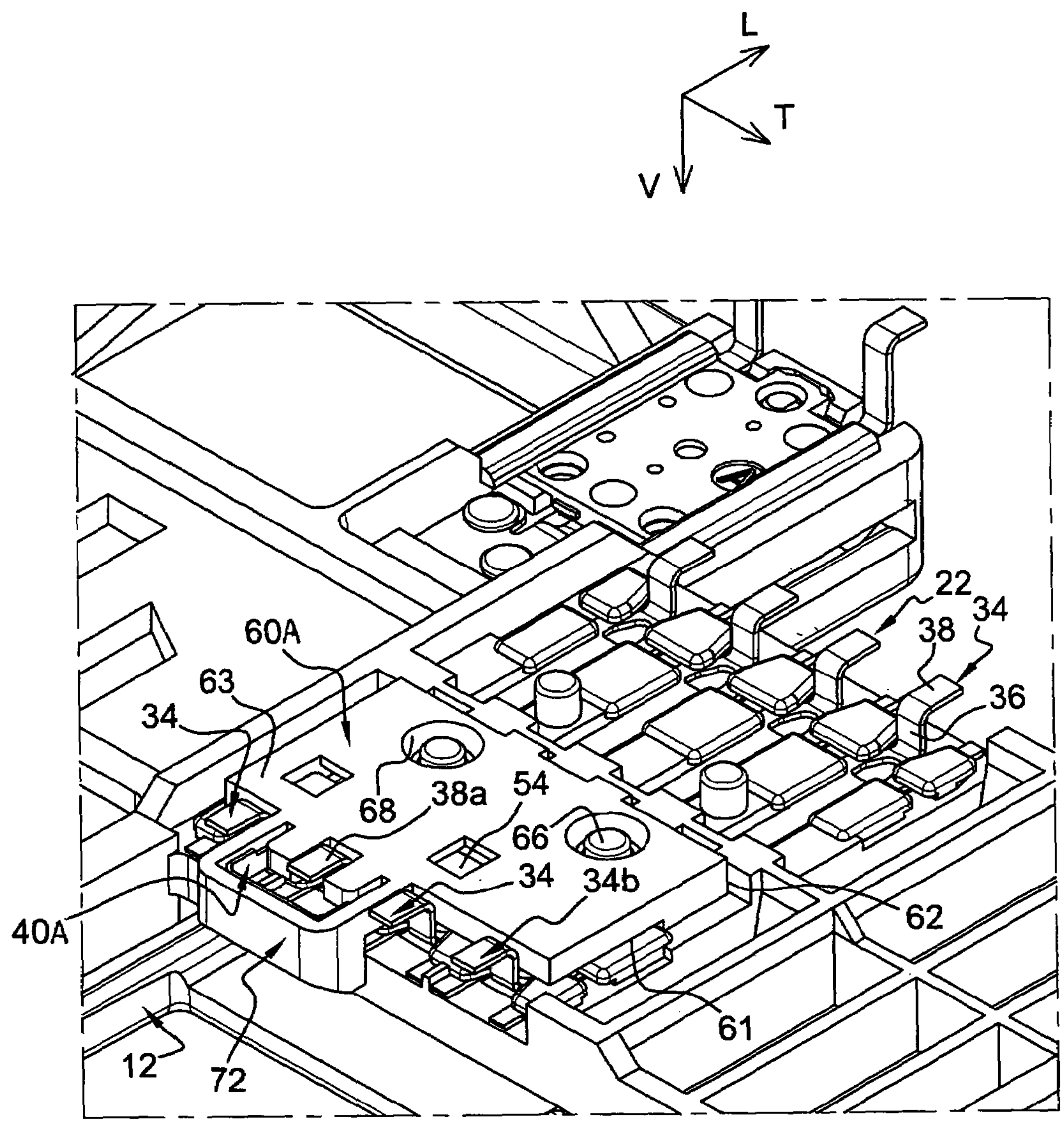

As may be seen in FIGS. 8 to 10, the support 60A in the form of a rectangular plate includes, in this case in its upper face 61, a large central aperture 74, 78 of rectangular outline which essentially houses the earth contact tongue 54 and includes, in its bottom 90, complementary molded shapes 92 and 94 which allow preassembly and retention in the assembled position of the cage 40A in the insulating support 60A, by plastic snap-fastening of the tongue 50 into the molded shapes 92 and 94.

For this purpose, the cage 40A is generally put into place and snap-fastened in the support 60A vertically downwards when considering FIG. 3.

When the combination of components illustrated in FIG. 10 has been mounted and assembled, it will be understood that the cage 40A is interposed vertically between the insulating support 60A and the bottom of the complementary housing 64 formed in the lower face 21 of the insulating block 14.

As may be seen in FIG. 10, no conducting part of the protective metal cage 40A is flush with the lower face 63 of the insulating support 60A.

The invention is not limited to the design of the connection tabs 34, and especially of the connection tab 34*a*, which is bent over for being connected by soldering or reflow-soldering.

The connection tab 34*a* may for example extend vertically, being of the type to be inserted into holes in the printed circuit board.

Likewise, the invention is not limited to the design of the electrical contact blades described, and especially that of the hairpin contact blade 22*a*, rather it can also be applied in the case of contact blades of the “cantilever” type, in which the curved free end is formed at the end of the connection branch 30*a*.

It is also possible to protect several contact blades of the connector.

What is claimed is:

1. A smart card connector for receiving a fully installed smart card, said connector having an insulative connector frame with a frame face that lies facewise adjacent to a smart card that has been fully installed, and said connector having a plurality of transversely spaced blade contacts with card-engaging parts that project vertically beyond said frame face for engaging contact pads of the smart card, wherein the connector is mounted on a circuit board that has at least one signal trace and at least one ground trace, and wherein a first of said blade contacts is a signal contact that has a rear end forming a signal tail that lies at a rear end of said frame and that is connected to one of said signal traces, and a second of said blade contacts is a ground contact with a rear end forming a ground tail that is connected to said ground trace, comprising:

a shield structure mounted on said connector, said shield structure having a rear part that lies rearward of said signal tail to block the unauthorized projection of a conductor device from the rear of said connector against said signal tail;

said shield structure includes a metal shield with a metal rearward portion that forms part of said rear shield portion;

said metal shield having a tongue that directly contacts said ground blade contact; said rear end of said frame being adjacent to rear end of the installed smart card.

2. The smart card connector described in claim 1 wherein:

said metal rearward portion of said metal shield has a primarily vertical part and has a lower end that lies against said ground trace on said circuit board; and said shield structure includes an insulative barrier with a rear portion that lies rearward of said metal rearward shield portion and facewise adjacent to said circuit board.

3. The smart card connector described in claim 1 wherein:

said insulative connector frame has a bottom with an upwardly-opening frame cavity therein:

said shield structure includes an insulative barrier that fits into said frame cavity, said insulative barrier having a barrier cavity, and said metal shield lies in said barrier cavity.

4. The smart card connector described in claim 1 wherein said first of said contacts is in the form of a bent elongated strip and includes an elongated primarily horizontal portion that extends rearward to said signal tail, and wherein:

said metal shield is formed of sheet metal and said rear shield portion includes walls lying on transversely opposite sides of said signal tail, and said metal shield also includes an elongated sheet metal strip portion that extends forwardly from said rear shield portion and directly under said first contact elongated horizontal portion.

5. The smart card connector described in claim 1 wherein:

said shield structure includes an insulative barrier with a vertical hole, said signal tail extends through said hole;

said insulative barrier also has a slot that extends most of the way around said hole, said rear structure of said metal shield lies in said slot and extends most of the way around said hole.

6. A smart card connector for receiving a smart card, said connector having an insulative connector frame with a frame face that lies facewise adjacent to a smart card that has been fully installed, and said connector having a plurality of contacts with card-engaging parts that project vertically beyond said frame face for engaging contact pads of the smart card, wherein the connector is designed to lie on a circuit board that has at least one signal trace and at least one ground trace, and wherein a first of said contacts is a signal contact that has a rear end forming a signal tail that lies at a rear end of said frame and that has a lower branch for connected to one of said signal traces, including:

a shield structure mounted on said connector, said shield structure including an insulative barrier and a sheet metal shield;

said insulative barrier having a portion with a hole and said signal tail extends down through said hole with said lower branch of said signal tail lying at the bottom of said hole, said hole has a vertical axis and said insulative barrier has a slot that extends more than 180° about said hole;

said sheet metal shield lies in said slot and extends more than 180° about said hole.

7. The smart card connector described in claim 6 wherein:

a second of said contacts is positioned to connect to said ground trace;

said sheet metal shield is directly connected to said second contact.

* * * * *